(12) United States Patent
Yehudai

(10) Patent No.: US 6,504,708 B2
(45) Date of Patent: Jan. 7, 2003

(54) KEY CHAIN ORGANIZER ASSEMBLY

(75) Inventor: Shai Yehudai, Bedminster, NJ (US)

(73) Assignee: Royal Consumer Information Products, Inc., Somerset, NJ (US)

( * ) Notice: Subject to any disclaimer, the term of this patent is extended or adjusted under 35 U.S.C. 154(b) by 0 days.

(21) Appl. No.: 09/878,364

(22) Filed: Jun. 11, 2001

(65) Prior Publication Data

US 2002/0186527 A1 Dec. 12, 2002

(51) Int. Cl.[7] .................................................. H05K 7/02
(52) U.S. Cl. ........................ 361/683; 361/700; 345/157; 240/6.4
(58) Field of Search ................................. 361/683, 687, 361/699, 700, 684–685, 680; 240/6.4; 362/116; 364/900; 345/157

(56) References Cited

U.S. PATENT DOCUMENTS

| | | | |
|---|---|---|---|
| 3,243,586 A | 3/1966 | Fioravanti | 240/6.4 |
| 3,296,429 A | 1/1967 | Schwartz | 240/6.4 |
| 3,937,939 A | 2/1976 | Frenkel | 235/156 |
| 4,128,889 A | 12/1978 | Ojima et al. | 364/705 |
| 4,276,582 A | 6/1981 | Burnett | 362/116 |
| 4,345,315 A * | 8/1982 | Cadotte et al. | 364/900 |
| 4,521,833 A | 6/1985 | Wolter | 362/116 |
| 5,432,510 A | 7/1995 | Matthews | 341/20 |
| 5,467,871 A | 11/1995 | DeField | 206/232 |
| 5,548,477 A * | 8/1996 | Kumar et al. | 361/680 |
| 5,786,819 A | 7/1998 | Weiser et al. | 345/354 |
| 5,982,520 A | 11/1999 | Weiser et al. | 359/172 |
| D424,547 S | 5/2000 | Seachuga | D14/116 |
| 6,130,666 A | 10/2000 | Persidsky | 345/179 |
| 6,201,534 B1 * | 3/2001 | Steele et al. | 345/157 |

OTHER PUBLICATIONS

Memorex Portable Keychain Organizer Catalogue, Mar. 27, 2001.

* cited by examiner

Primary Examiner—Darren Schuberg
Assistant Examiner—Hung Van Duong
(74) Attorney, Agent, or Firm—Roberts & Mercanti, LLP

(57) ABSTRACT

A hand held electronic data organizer which may conveniently serve as a portable key chain device. The organizer includes a housing which contains internal electronic components such as a microprocessor coupled to a data memory. These internal components are electronically coupled to external electronic components of the housing such as an input arrangement, for entering alphanumeric data into the data memory, and a display, for displaying such data recalled from the data memory. The organizer also includes a backlight for illuminating the display, and a flashlight element for projecting a beam of light outside of the housing. The invention preferably includes a key chain attachment implement for attaching keys and the like to the housing.

23 Claims, 2 Drawing Sheets

KEY CHAIN ORGANIZER ASSEMBLY

BACKGROUND OF THE INVENTION

1. Field of the Invention

The present invention relates to portable data processing devices. More particularly, the invention relates to a key chain device which comprises an electronic data organizer having a flashlight element.

2. Description of the Related Art

Portable data processing devices that assist with processing and information needs include personal digital assistants (PDAs), calculators, data organizers, and the like. PDA's are small devices, typically smaller than a notebook computer, which store personal information and also may serve as an interface to communications. They typically include a means for data input, a data processing means, a display, and optional telecommunications capabilities. PDAs, which are much more versatile computers, are often characterized by a relatively large touch sensitive screen which serves as both the input and output interface.

Data organizers are typically smaller yet than PDA's, and are able to receive, store, process, and display certain types of alphanumeric information. Typically, they are used for keeping track of phone numbers, addresses, appointments, and the like. While data organizers can be thought of as computers, they hold a separate niche in the market because of their smaller size and special operating system.

Data organizers are typically small enough to fit in a purse or briefcase. However, they are often clumsy or burdensome objects to carry when a user is not holding a purse or briefcase. Furthermore, it is often difficult or impossible to use such data organizers in dark or dimly lit areas It would therefore be desirable to provide an electronic data organizer which is convenient for users to carry anywhere, at any time. It would also be desirable to provide an organizer which comprises a backlit display and a flashlight component. The present invention provides a solution to this problem.

The invention relates to a hand held electronic data organizer which may conveniently serve as a portable key chain. The organizer includes a housing which contains internal electronic components such as a microprocessor coupled to a data memory. These internal components are electronically coupled to external electronic components of the housing such as an input arrangement, for entering alphanumeric data into the data memory, and a display, for displaying such data recalled from the data memory. The organizer also includes a backlight for illuminating the display, and a flashlight for projecting a beam of light outside of the housing. The invention preferably includes a key chain attachment implement for attaching keys and the like to the housing. Thus, the invention relates to a device which could be attached to a user's key chain, and could be used in dark settings.

SUMMARY OF THE INVENTION

The invention provides a hand held electronic data organizer which comprises:

a) a housing;
b) a microprocessor within the housing which is coupled to a data memory;
c) an input arrangement coupled to the microprocessor which is capable of inputting alphanumeric data into the data memory via the microprocessor;
d) a display coupled to the microprocessor which is capable of visually displaying alphanumeric data recalled from the data memory via the microprocessor;
e) a flashlight within the housing, which is capable of projecting a beam of light outside of the housing;
f) a backlight within the housing which is capable of backlighting the display; and
g) a switch on the housing capable of illuminating each of the flashlight and the backlight.

The invention further provides key chain device which comprises:

a) a housing;
b) a microprocessor within the housing which is coupled to a data memory;
c) an input arrangement coupled to the microprocessor which is capable of inputting alphanumeric data into the data memory via the microprocessor;
d) a display coupled to the microprocessor which is capable of visually displaying alphanumeric data recalled from the data memory via the microprocessor;
e) a flashlight within the housing, which is capable of projecting a beam of light outside of the housing;
f) a backlight within the housing which is capable of backlighting the display;
g) a switch on the housing capable of illuminating each of the flashlight and the backlight; and
h) a key attachment implement attached to said housing for attaching keys to the housing.

The invention still further provides a method for organizing data which comprises:

a) providing an electronic data organizer which comprises:
   i) a housing;
   ii) a microprocessor within the housing which is coupled to a data memory;
   iii) an input arrangement coupled to the microprocessor which is capable of inputting alphanumeric data into the data memory via the microprocessor;
   iv) a display coupled to the microprocessor which is capable of visually displaying alphanumeric data recalled from the data memory via the microprocessor;
   v) a flashlight within the housing, which is capable of projecting a beam of light outside of the housing;
   vi) a backlight within the housing which is capable of backlighting the display; and
   vii) a switch on the housing capable of illuminating each of the flashlight and the backlight;
b) entering alphanumeric data into the data memory via the microprocessor; and
c) recalling such entered alphanumeric data from the data memory via the microprocessor

DETAILED DESCRIPTION OF THE PREFERRED EMBODIMENT

Figure 1:
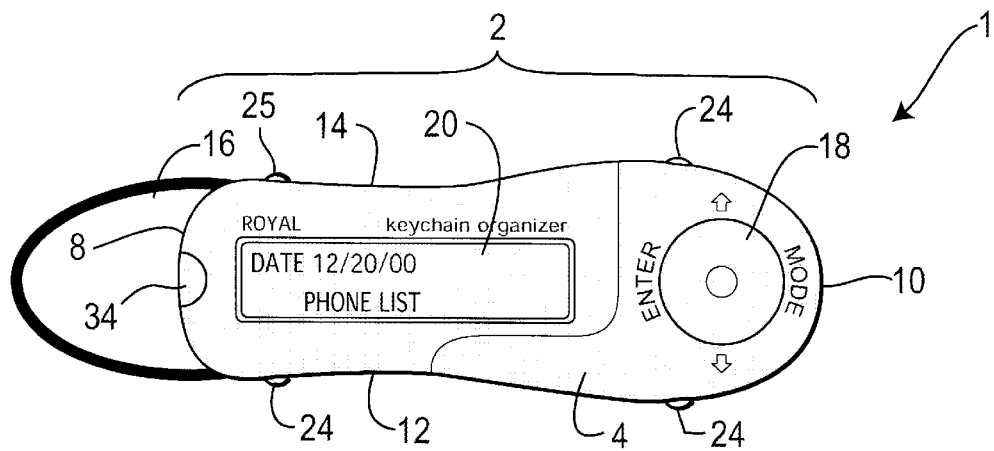
FIG. 1 shows a front view of a hand held electronic data organizer of the invention.
Figure 2:
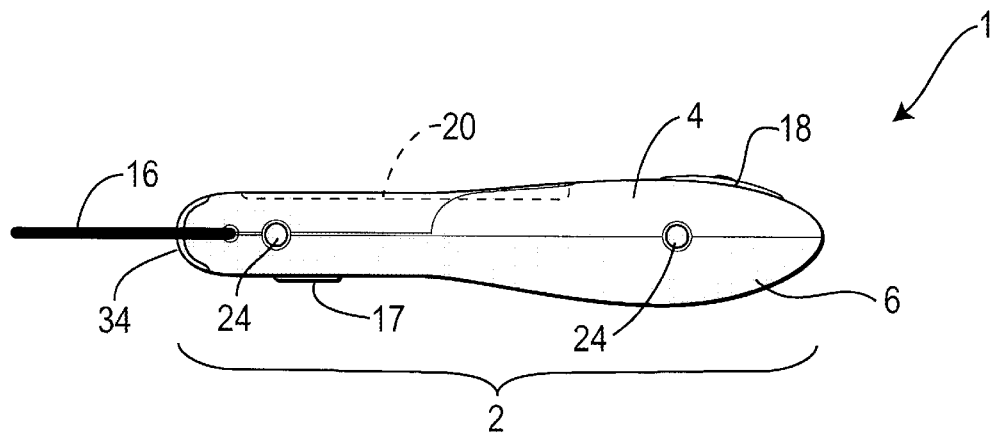
FIG. 2 shows a side view of a hand held electronic data organizer of the invention.
Figure 3:
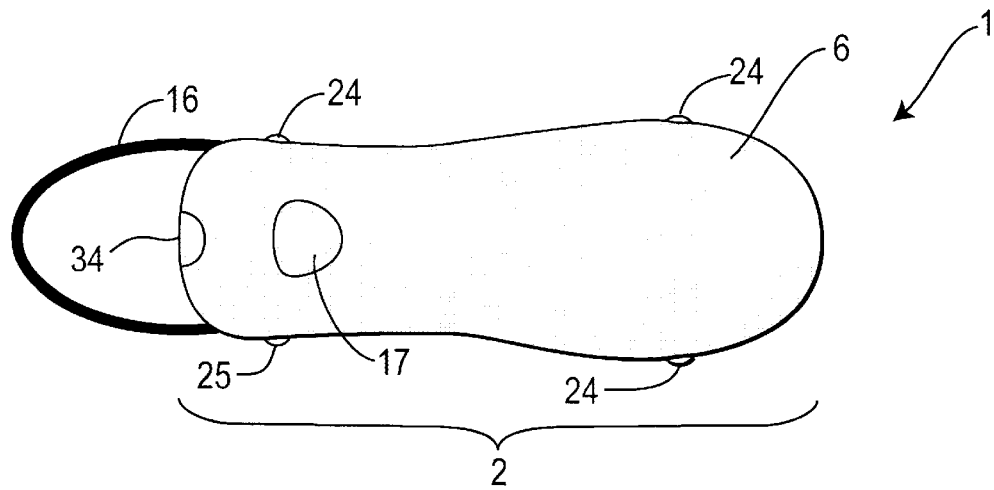
FIG. 3 shows a rear view of a hand held electronic data organizer of the invention.

The invention provides a hand held electronic data organizer, which is shown in FIGS. 1, 2, and 3. These figures show a front, side, and rear view, respectively, of a hand held electronic data organizer 1 according to the invention. FIGS. 1 and 2 show a housing 2 having a front surface 4 and a rear surface 6, a top edge 8, a bottom edge 10 and left and right side edges 12 and 14 respectively. The housing 2 serves as a protective structure for encasing other components of the invention. The housing 2 may comprise plastic, metal, rubber, and the like or combinations thereof, or any other material which one skilled in the art may deem suitable for forming a protective structure. In a preferred embodiment, the housing comprises a plastic. The housing 2 is preferably formed into a compact pocket sized or key chain sized shape which can comfortably fit into a user's hand or pocket.

As shown in FIGS. 1–3, the housing 2 comprises a key attachment implement 16 for attaching keys to the housing 2. The key attachment implement 16 may be present in the form of a hook, a split ring, a loop or any other shape which would be suitable for securely attaching a key or key ring to the housing 2. The key attachment implement may comprise any material such as plastic, metal, rubber, and the like or combinations thereof, or any other material which one skilled in the art may deem as suitable for securely attaching a key or key ring to the housing 2. The key attachment implement 16 may be attached to the housing 2 using any conventional means such as gluing, soldering, molding, and the like. In a preferred embodiment of the invention, the key attachment implement comprises a plastic loop having two ends, wherein each end is attached to the housing, and wherein at least one end is detachable from the housing. At least one end preferably comprises a catch 25 for attaching and detaching the plastic loop from the housing 2.

Figure 4:
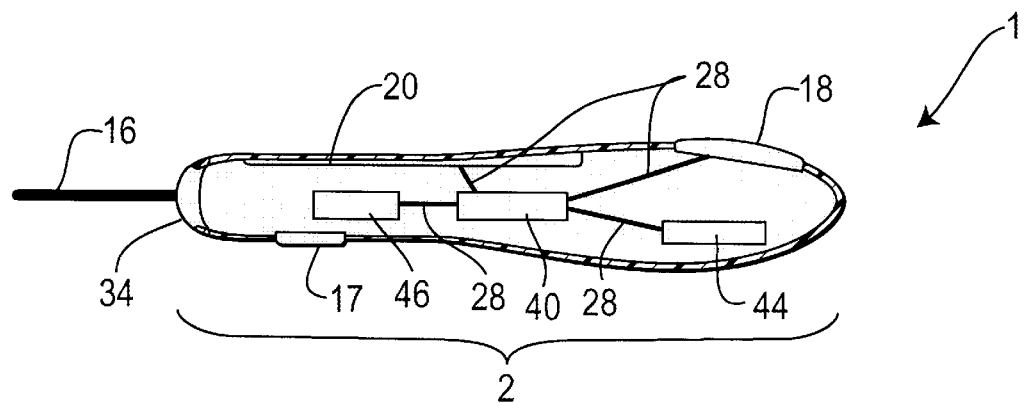
FIG. 4 shows a side cut away view of a hand held electronic data organizer of the invention schematically showing a microprocessor, data memory, input arrangement, display and power source.
Figure 5:
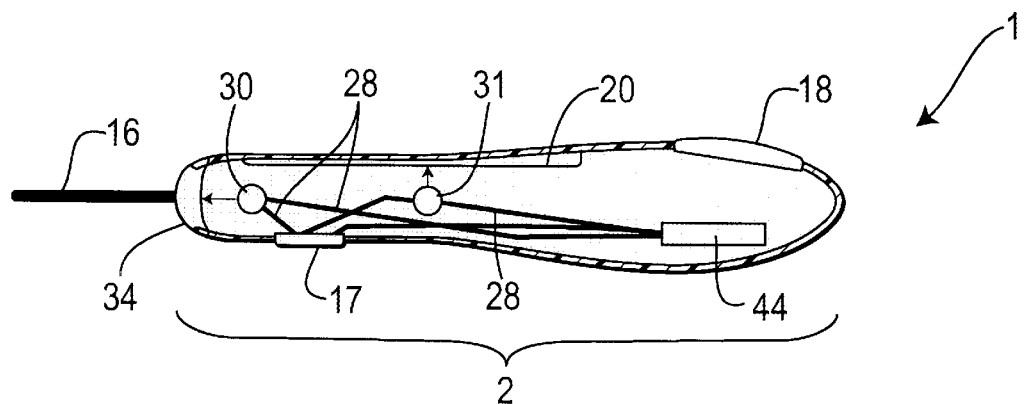
FIG. 5 shows a side cut away view of a hand held electronic data organizer of the invention having a flashlight and backlight having two separate light sources.
Figure 6:
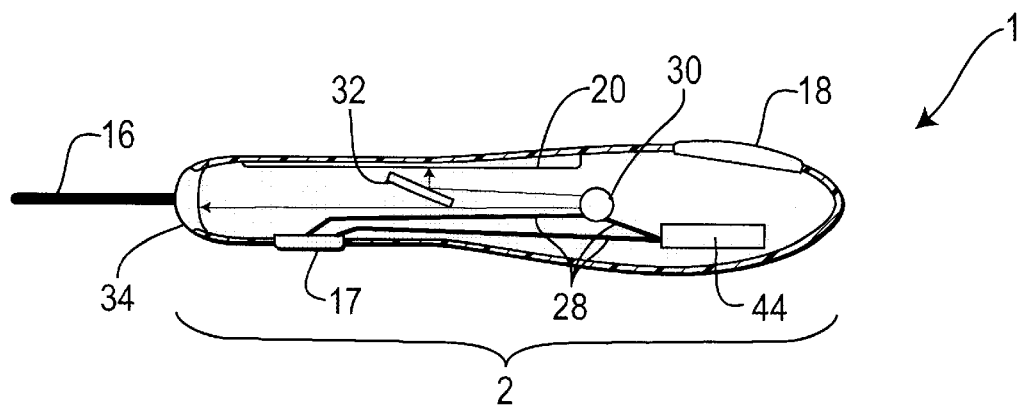
FIG. 6 shows a side cut away view of a hand held electronic data organizer of the invention having a flashlight and backlight having a single common light source.

FIGS. 4 through 6 show a schematic representation of the component parts inside the housing. FIG. 4 shows a microprocessor 40 encased in the housing 2. Such microprocessors are well known in the art. The microprocessor 40 is electrically coupled via wires 28 to a data memory 46 which is capable of receiving and storing data such as alphanumeric data. Such data memories are well known in the art.

The microprocessor 40 is also electrically coupled via wires 28 to an input arrangement 18, which is capable of entering alphanumeric data into said data memory via said microprocessor. The input arrangement may comprise any conventional data inputting means known to those skilled in the art such as a multimode button. FIG. 1 shows one preferred embodiment where an input arrangement 18 comprises at least one depressible button for entering data into the data memory. Data may also be entered into the data memory using other input arrangements known in the art such as by touching the screen with a pen or stylus.

As shown in FIG. 4, the microprocessor 40 is also electrically coupled via wires 28 to a display 20 which is capable of visually displaying alphanumeric data recalled from said data memory via said microprocessor. The display may comprise any known conventional means for visually displaying data, such as a black and white or color screen. In a most preferred embodiment, the display comprises a liquid crystal display (LCD) as shown in FIG. 1. The microprocessor, input arrangement, and display are well known in the art such as from U.S. Pat. Nos. 5,625,673, 5,818,924 and 5,548,477 which are incorporated herein by reference.

The microprocessor 40 is electrically connected to a power source. The power source may comprise any conventional power supplying means known in the art. Preferably, the power source comprises a battery or the like. FIG. 4 shows a most preferred embodiment of the invention wherein the power source comprises a battery 44 located within the housing 2, and which battery is electrically connected via wires 28 to the microprocessor 40. According to this embodiment, power is supplied to the display 20, the input arrangement 18, and the data memory 46 from the battery 44 via the microprocessor 40.

The electronic data organizer of the invention also comprises a flashlight and a backlight encased within the housing 2. The housing preferably comprises a light switch, in the form of a button or the like, for illuminating each of the flashlight element and the backlight. Most preferably, the switch is capable of simultaneously illuminating each of the flashlight element and the backlight. In one preferred embodiment, shown in FIG. 3, the switch 17 is present in the form of a button which is located on the rear surface 6 of the housing 2.

The flashlight is capable of projecting a beam of light outside of the housing. As shown in FIGS. 5 and 6, the flashlight comprises a lens 34, and a light source 30. The lens 34 preferably comprises plastic or glass. The light source 30 preferably comprises a light bulb. According to one preferred embodiment of the invention, a switch 17 is electrically attached via wires 28 to the light source 30. Both the switch and the light source are electrically attached to a power source. This is shown in FIGS. 5 and 6, where the switch 17 and the light source 30 are electrically attached via wires 28 to battery 44. When the switch 17 is engaged, the battery 44 powers the light source 30 which projects a beam of light that passes through the lens 34 and out of the housing 2.

The backlight is capable of illuminating the display 20. The backlight preferably comprises a light source and an optional light reflector. In the embodiment of FIG. 5 the backlight comprises a separate light source 31. In the embodiment of FIG. 6, the backlight and the flashlight share a common light source wherein a portion of the light is reflected toward the display. The light reflector, shown in FIG. 6, preferably comprises a reflective metal or mirror. FIG. 5 shows an embodiment of the invention where separate light sources are used. As described above, a light source 30 is electrically attached via wires 28 to the switch 17 for illuminating the flashlight. A second light source 31 is electrically attached via wires 28 to the switch 17. Both the switch 17 and the second light source 31 are electrically attached via wires 28 to a battery 44. When the switch 17 is engaged, the battery 44 powers the second light source 31, which projects a beam of light that illuminates the display 20.

FIG. 6 shows an embodiment where a common light source is used for both the flashlight and the backlight. As shown in FIG. 6, a light source 30 is electrically attached via wires 28 to the switch 17. Both the switch 17 and the light source 30 are electrically attached via wires 28 to a battery 44. When the switch 17 is engaged, the battery 44 powers the light source 30 which projects a beam of light. A portion of the beam of light is reflected by a light reflector 32, thus illuminating the display 20. Another portion of the beam of light passes through a lens 34, and out of the housing 2.

As shown in FIGS. 1–3, the housing 2 may further comprise one or more additional control buttons 24 for controlling other features of the invention such as contrast, color, volume, and the like.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A pocket sized hand held electronic data organizer which comprises:
   a) a pocket sized housing;
   b) a microprocessor within the pocket sized housing which is coupled to a data memory;
   c) an input arrangement coupled to the microprocessor which is capable of inputting alphanumeric data into the data memory via the microprocessor;
   d) a display coupled to the microprocessor which is capable of visually displaying alphanumeric data recalled from the data memory via the microprocessor;
   e) a flashlight within the pocket sized housing, which is capable of projecting a beam of light outside of the pocket sized housing;
   f) a backlight within the pocket sized housing which is capable of backlighting the display; and
   g) a switch on the pocket sized housing capable of illuminating each of the flashlight and the backlight.

2. The organizer of claim 1 wherein the switch on the pocket sized housing is capable of simultaneously illuminating each of the flashlight and the backlight.

3. The organizer of claim 1 wherein the pocket sized housing further comprises a key attachment implement for attaching keys to the pocket sized housing.

4. The organizer of claim 1 wherein the flashlight comprises a light source and a lens, and wherein the backlight comprises a light reflector, such that a portion of light emitted from the light source is reflected by the light reflector to backlight the display, and another portion of light emitted from the lens is directed through the lens to project a beam of light outside of the pocket sized housing.

5. The organizer of claim 1 wherein the input arrangement comprises at least one depressible key.

6. The organizer of claim 1 wherein the display comprises a liquid crystal display.

7. The organizer of claim 1 wherein the switch comprises a depressible button.

8. The method of claim 3 wherein the key attachment implement comprises a loop molded to the pocket sized housing.

9. A key chain device which comprises:
   a) a pocket sized housing;
   b) a microprocessor within the pocket sized housing which is coupled to a data memory;
   c) an input arrangement coupled to the microprocessor which is capable of inputting alphanumeric data into the data memory via the microprocessor;
   d) a display coupled to the microprocessor which is capable of visually displaying alphanumeric data recalled from the data memory via the microprocessor;
   e) a flashlight within the pocket sized housing, which is capable of projecting a beam of light outside of the pocket sized housing;
   f) a backlight within the pocket sized housing which is capable of backlighting the display;
   g) a switch on the pocket sized housing capable of illuminating each of the flashlight and the backlight; and
   h) a key attachment implement attached to said pocket sized housing for attaching keys to the pocket sized housing.

10. The key chain device of claim 9 wherein the switch on the pocket sized housing is capable of simultaneously illuminating each of the flashlight and the backlight.

11. The device of claim 9 wherein the flashlight comprises a light source and a lens, and wherein the backlight comprises a light reflector, such that a portion of light emitted from the light source is reflected by the light reflector to backlight the display, and another portion of light emitted form the light source is directed through the lens to project a beam of light outside of the pocket sized housing.

12. The device of claim 9 wherein the input arrangement comprises at least one depressible key.

13. The device of claim 9 wherein the display comprises a liquid crystal display.

14. The device of claim 9 wherein the switch comprises a depressible button.

15. The device of claim 9 wherein the key attachment implement comprises a loop molded to the pocket sized housing.

16. A method for organizing data which comprises:
   a) providing a pocket sized electronic data organizer which comprises:
      i) a pocket sized housing;
      ii) a microprocessor within the pocket sized housing which is coupled to a data memory;
      iii) an input arrangement coupled to the microprocessor which is capable of inputting alphanumeric data into the data memory via the microprocessor;
      iv) a display coupled to the microprocessor which is capable of visually displaying a alphanumeric data recalled from the data memory via the microprocessor;
      v) a flashlight within the pocket sized housing, which is capable of projecting a beam of light outside of the pocket sized housing;
      vi) a backlight within the pocket sized housing which is capable of backlighting the display; and
      vii) a switch on the pocket sized housing capable of illuminating each of the flashlight and the backlight;
   b) entering alphanumeric data into the data memory via the microprocessor; and
   c) recalling such entered alphanumeric data from the data memory via the microprocessor.

17. The method of claim 16 wherein the switch on the pocket sized housing is capable of simultaneously illuminating each of the flashlight and the backlight.

18. The method of claim 16 wherein the pocket sized housing further comprises a key attachment implement for attaching keys to the pocket sized housing.

19. The method of claim 16 wherein the flashlight comprises a light source and a lens, and wherein the backlight comprises a light reflector, such that a portion of light emitted from the light source is reflected by the light reflector to backlight the display, and another portion of light emitted from the light source is directed through the lens to project a beam of light outside of the pocket sized housing.

20. The method of claim 16 wherein the input arrangement comprises at least one depressible key.

21. The method of claim 16 wherein the display comprises a liquid crystal display.

22. The method of claim 16 wherein the switch comprises a depressible button.

23. The method of claim 16 wherein the key attachment implement comprises a loop molded to the pocket sized housing.

* * * * *